(12) United States Patent
Chen et al.

(10) Patent No.: US 8,456,810 B2
(45) Date of Patent: Jun. 4, 2013

(54) POWER SUPPLY ASSEMBLY

(75) Inventors: Yun-Lung Chen, Taipei Hsien (TW);
Can-Ming Liang, Shenzhen (CN);
Gang Su, Shenzhen (CN); Nian-Yuan Yang, Shenzhen (CN)

(73) Assignees: Hong Fu Jin Precision Industry (ShenZhen) Co., Ltd., Shenzhen (CN);
Hon Hai Precision Industry Co., Ltd., New Taipei (TW)

( * ) Notice: Subject to any disclaimer, the term of this patent is extended or adjusted under 35 U.S.C. 154(b) by 311 days.

(21) Appl. No.: 12/887,227

(22) Filed: Sep. 21, 2010

(65) Prior Publication Data
US 2011/0273843 A1 Nov. 10, 2011

(30) Foreign Application Priority Data
May 4, 2010 (CN) .......................... 2010 1 0162017

(51) Int. Cl.
*G06F 1/16* (2006.01)
(52) U.S. Cl.
USPC ...................... 361/679.01; 361/690
(58) Field of Classification Search
USPC .............................. 361/679.01, 690
See application file for complete search history.

(56) References Cited

U.S. PATENT DOCUMENTS

| | | | | |
|---|---|---|---|---|
| 5,172,305 A * | 12/1992 | DeWilde | ........................ | 361/796 |
| 6,247,767 B1 * | 6/2001 | Liu et al. | ..................... | 312/223.2 |
| 6,270,046 B1 * | 8/2001 | Liu et al. | ..................... | 248/231.9 |
| 6,272,009 B1 * | 8/2001 | Buican et al. | ............. | 361/679.32 |
| 6,751,100 B2 * | 6/2004 | Chen | ............................... | 361/725 |
| 7,057,898 B2 * | 6/2006 | Chen et al. | ..................... | 361/725 |
| 7,088,587 B2 * | 8/2006 | Chen et al. | ..................... | 361/724 |
| 7,113,396 B2 * | 9/2006 | Chen et al. | ..................... | 361/807 |
| 7,123,469 B2 * | 10/2006 | Chen et al. | ..................... | 361/601 |
| 7,206,197 B2 * | 4/2007 | Chen et al. | ............... | 361/679.02 |
| 7,218,508 B2 * | 5/2007 | Chen et al. | ............... | 361/679.57 |
| 7,254,011 B2 * | 8/2007 | Chen et al. | ............... | 361/679.01 |
| 7,327,567 B2 * | 2/2008 | Chen et al. | ............... | 361/679.41 |
| 7,365,971 B2 * | 4/2008 | Chen et al. | ............... | 361/679.33 |
| 7,443,662 B2 * | 10/2008 | Chen et al. | ............... | 361/679.55 |
| 7,542,269 B2 * | 6/2009 | Chen et al. | ............... | 361/679.02 |
| 7,639,506 B2 * | 12/2009 | Chen et al. | ..................... | 361/747 |
| 7,839,638 B2 * | 11/2010 | Ye et al. | ......................... | 361/695 |
| 7,848,088 B2 * | 12/2010 | Liu | .......................... | 361/679.02 |
| 8,075,070 B2 * | 12/2011 | Fan et al. | ..................... | 312/223.2 |
| 8,199,499 B2 * | 6/2012 | Chen et al. | ................. | 361/679.6 |
| 2006/0139866 A1 * | 6/2006 | Chen et al. | ..................... | 361/683 |
| 2007/0153451 A1 * | 7/2007 | Chen et al. | ..................... | 361/679 |
| 2010/0149778 A1 * | 6/2010 | Yeh et al. | ....................... | 361/809 |
| 2011/0012482 A1 * | 1/2011 | Chen et al. | ..................... | 312/213 |
| 2011/0043996 A1 * | 2/2011 | Chen et al. | ............... | 361/679.58 |

\* cited by examiner

*Primary Examiner* — Lisa Lea Edmonds
(74) *Attorney, Agent, or Firm* — Altis Law Group, Inc.

(57) ABSTRACT

A power supply assembly includes an enclosure body, a cover panel mounted to the enclosure body, a power supply, and a positioning element mounted to the cover panel. The enclosure body includes a bottom panel, a rear panel substantially perpendicular to the bottom panel, and a side panel substantially perpendicular to the bottom panel and the rear panel. The power supply assembly is mounted in the enclosure body and is prevented from moving in a first direction, that is substantially perpendicular to the rear panel, and a second direction, that is substantially perpendicular to the side panel, and disposed between the bottom panel and the cover panel. The positioning element includes a first ladder-shaped positioning tab abutting two adjacent surfaces of the power supply and preventing the power supply assembly from moving in a third direction, that is substantially perpendicular to the cover panel and the second direction.

19 Claims, 5 Drawing Sheets

POWER SUPPLY ASSEMBLY

BACKGROUND

1. Technical Field

The present disclosure relates to power supply assemblies.

2. Description of Related Art

A conventional computer system usually includes a power supply in a computer case. The installation of the power supply in the computer case usually involves the use of screws. However, it is inconvenient to use the screws to secure the power supply to the computer case or remove the power supply from the computer case. The screws are small and difficult to manipulate and install. Additionally, because of their small size, the screws may be dropped during the process, possibly causing damage to other parts in the computer case.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
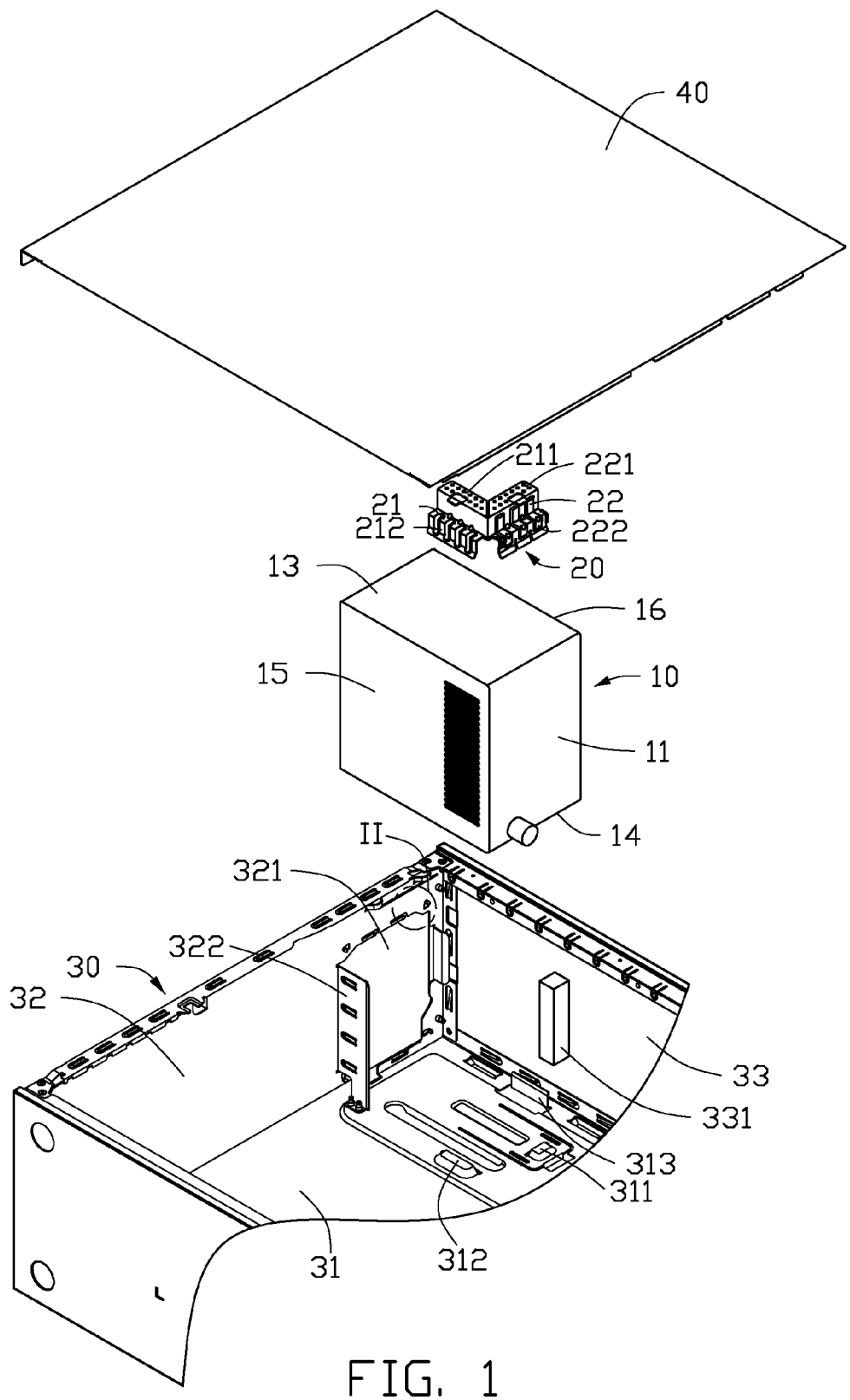
FIG. 1 is an exploded, isometric view of a power supply assembly of an embodiment, including a positioning element and a cover panel.
Figure 2:
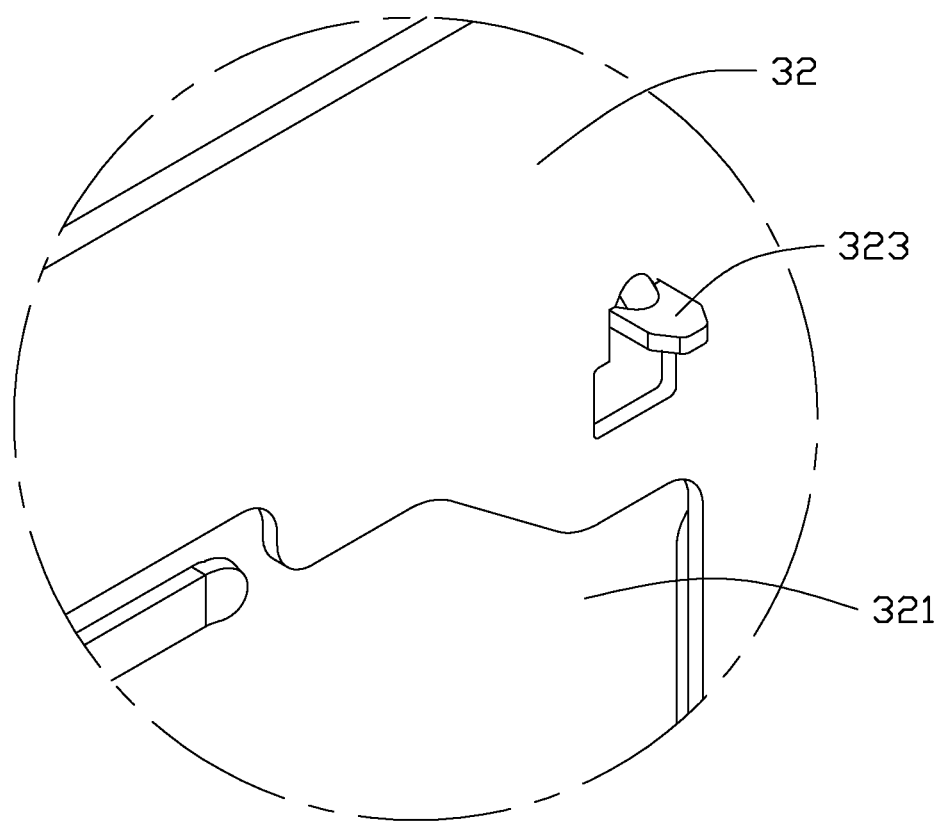
FIG. 2 is an enlarged view of section II of FIG. 1.
Figure 3:
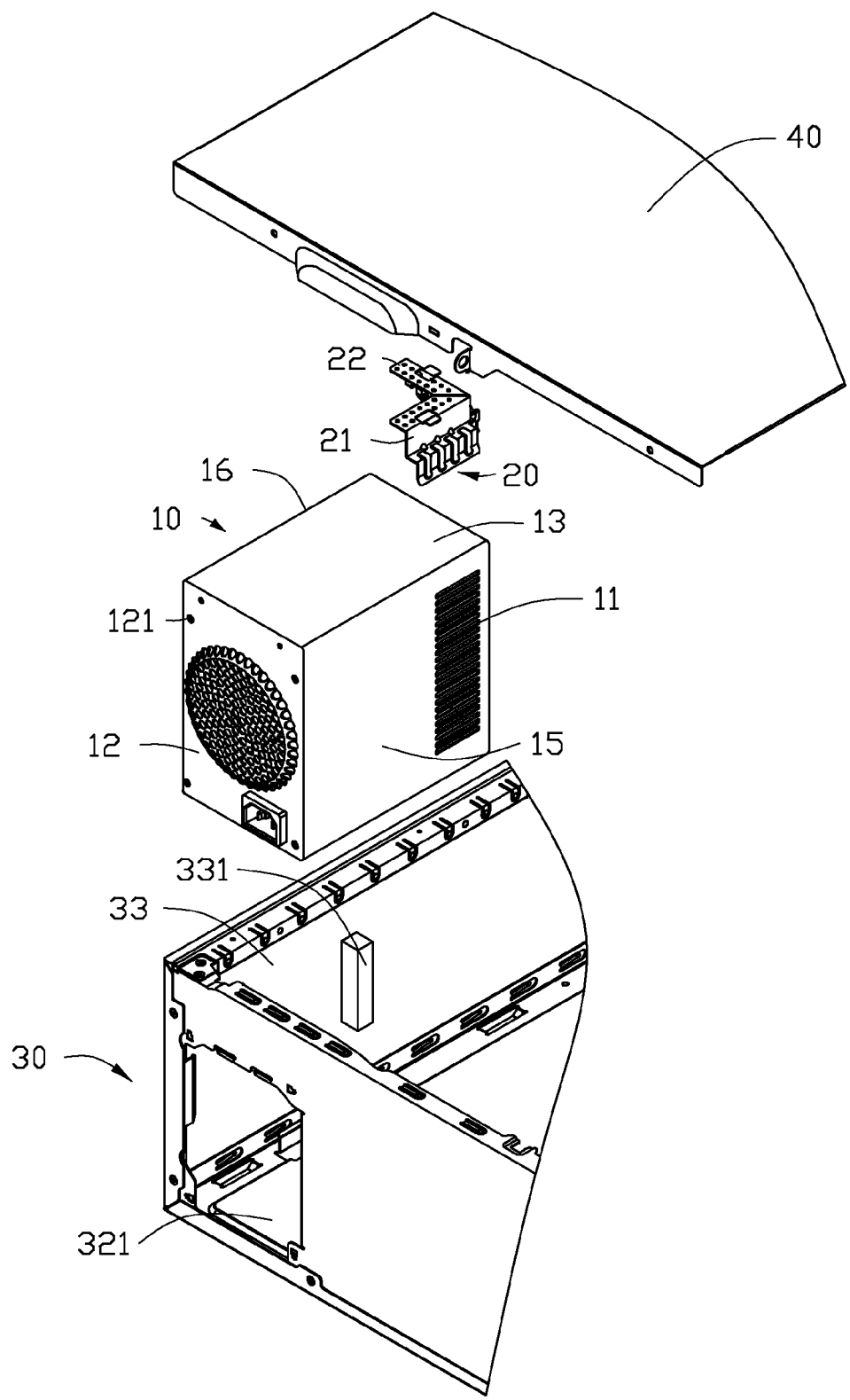
FIG. 3 is similar to FIG. 1, but viewed from another aspect.
Figure 4:
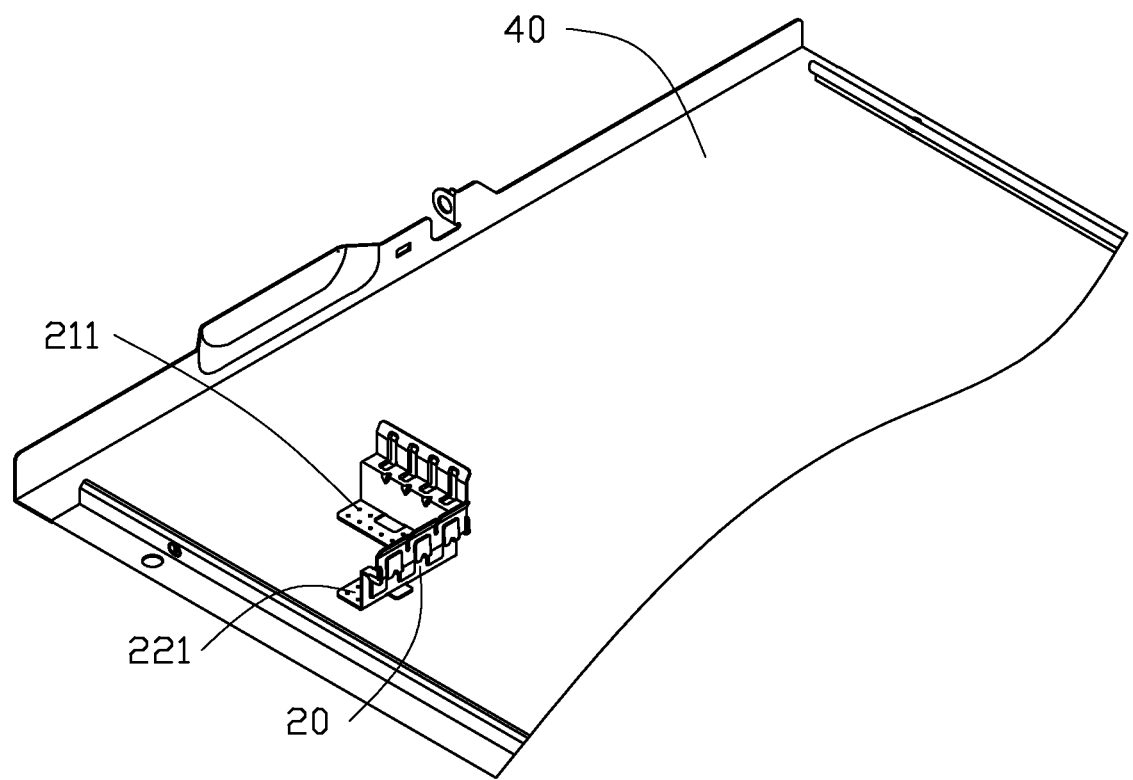
FIG. 4 is an assembled view of a positioning element and cover panel of FIG. 1.
Figure 5:
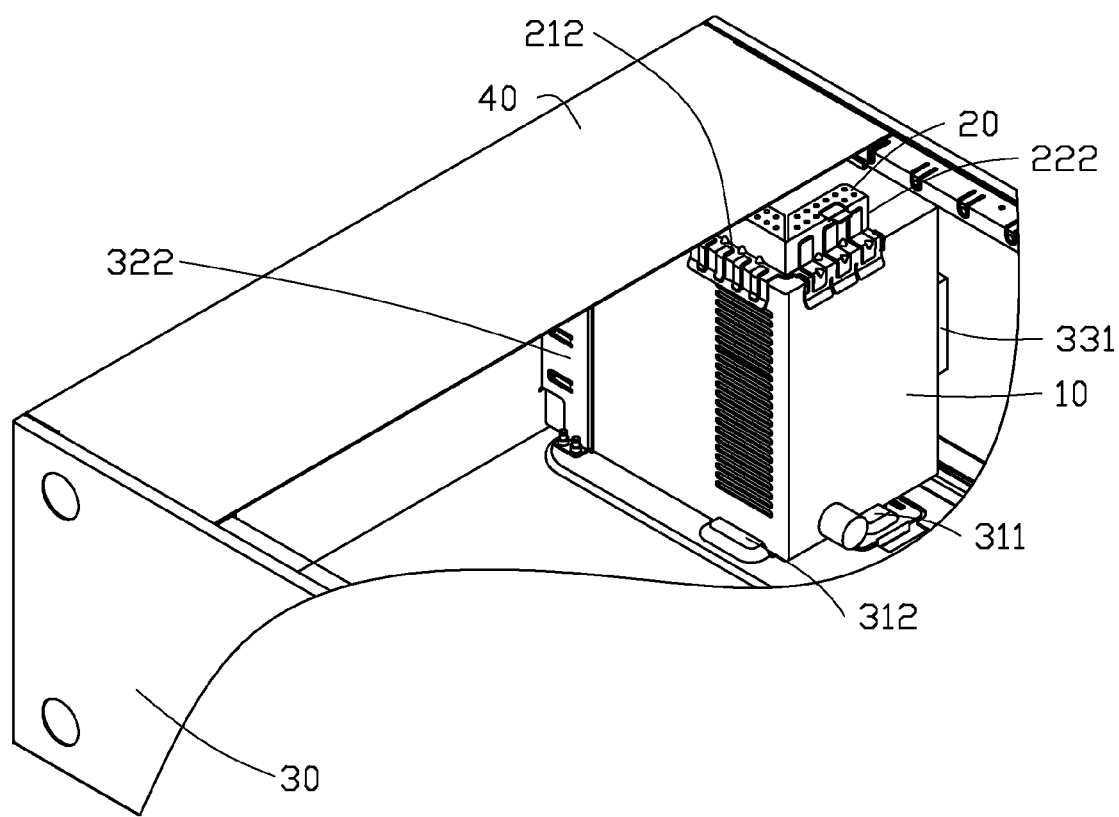
FIG. 5 is an assembled view of FIG. 1.

Referring to FIG. 1, a power supply assembly includes an enclosure, a power supply 10, and a positioning element 20.

The enclosure includes an enclosure body 30 and a cover panel 40 mounted to the enclosure body 30. The enclosure body 30 includes a bottom panel 31, that is substantially parallel to the cover panel 40; a rear panel 32, that is substantially perpendicular to the bottom panel 31; and a side panel 33, that is substantially perpendicular to the bottom panel 31. The side panel 33 is substantially perpendicular to the rear panel 32.

The bottom panel 31 includes a first resisting portion 311, a second resisting portion 312, and a third resisting portion 313. An airflow opening 321 is defined in the rear panel 32. The rear panel 32 includes a resisting plate 322 adjacent to the airflow opening 321. The rear panel 32 further includes four protrusions 323 surrounding the airflow opening 321. The side panel 33 includes an elastic element 331 made of rubber.

The power supply 10 defines a front surface 11; a rear surface 12, that is substantially parallel to the front surface 11; a top surface 13; a bottom surface 14, that is substantially parallel to the top surface 13; a first side surface 15; and a second side surface 16, that is substantially parallel to the first side surface 15. Four positioning holes 121 are defined in the rear surface 12 corresponding to the protrusions 323 of the rear panel 32. A distance between the first side surface 15 and the second side surface 16 is less than that between the second resisting portion 312 and the third resisting portion 313, and it is also less than the distance between the resisting plate 322 and the side panel 33. A distance between the front surface 11 and the rear surface 12 is less than that between the first resisting portion 3111 and the rear panel 32.

The positioning element 20 includes a first positioning portion 21 and a second positioning portion 22 substantially perpendicular to the first positioning portion 21. The first positioning portion 21 includes a first securing portion 211 and a first ladder-shaped positioning tab 212 extending from the first securing portion 211. The second positioning portion 22 includes a second securing portion 221 and a second ladder-shaped tab 222 extending from the second securing portion 221. The first securing portion 211 and the second securing portion 221 are capable of being secured to the inner side of the cover panel 40 by spot welding.

Referring to FIGS. 1 through 5, in assembly, the rear surface 12 of the power supply 10 is aligned with the airflow opening 321 of the rear panel 32, and the positioning holes 121 of the power supply 10 are aligned with the protrusions 323 of the rear panel 32. The first side surface 15 and the second side surface 16 of the power supply 10 are placed between the second resisting portion 312 and the third resisting portion 313. The power supply 10 is pushed backwards until the rear surface 12 abuts the rear panel 32. At this time, the protrusions 323 are mounted in the positioning holes 121. The front side of the power supply 10 is pressed downwards to position the front surface 11 and the rear surface 12 of the power supply 10 between first resisting portion 311 and the rear panel 32. The first and second securing portions 211, 221 of the positioning element 20 are welded to the inner side of the cover panel 40. The cover panel 40 is mounted to the enclosure body 30. The first ladder-shaped positioning tab 212 abuts the first side surface 15 and the top surface 13 of the power supply 10. The second ladder-shaped positioning tab 212 abuts the front surface 11 and the top surface 13 of the power supply 10. The elastic element 331 abuts the second side surface 16 of the power supply 10.

In disassembly, the cover panel 40 is dismounted from the enclosure body 30. The front portion of the power supply 10, when raised, separates from the first resisting portion 311, and forward motion separates power supply 10 from the enclosure body 30.

It is to be understood, however, that even though numerous characteristics and advantages of the present disclosure have been set forth in the foregoing description, together with details of the structure and function of the disclosure, the disclosure is illustrative only, and changes may be made in detail, especially in matters of shape, size, and arrangement of parts within the principles of the disclosure to the full extent indicated by the broad general meaning of the terms in which the appended claims are expressed.

What is claimed is:

1. A power supply assembly, comprising:
   an enclosure body comprising a bottom panel, a rear panel substantially perpendicular to the bottom panel, and a side panel substantially perpendicular to the bottom panel and the rear panel;
   a cover panel mounted to the enclosure body and substantially parallel to the bottom panel;
   a power supply mounted in the enclosure body to be prevented from moving along a first direction, that is substantially perpendicular to the rear panel, and a second direction, that is substantially perpendicular to the side panel, the power supply disposed between the bottom panel and the cover panel; and
   a positioning element mounted to the cover panel, the positioning element comprising a first step ladder-shaped positioning tab, the first step ladder-shaped positioning tab abuts two adjacent surfaces of the power supply to prevent the power supply from moving along a third direction, that is substantially perpendicular to the cover panel and the second direction.

2. The power supply assembly of claim 1, wherein the positioning element further comprises a second step ladder-shaped position tab abutting two adjacent surfaces of the power supply to prevent the power supply from moving along the third direction and the first direction.

3. The power supply assembly of claim 1, wherein the bottom panel comprises a first resisting portion, and the power supply is disposed between the first resisting portion and the rear panel to be prevented from moving along the first direction.

4. The power supply assembly of claim 3, wherein the bottom panel comprises a second resisting portion, and the power supply is disposed between the second resisting portion and the side panel to be prevented from moving along the second direction.

5. The power supply assembly of claim 4, wherein the bottom panel comprises a third resisting portion adjacent to the side panel, and the power supply is disposed between the third resisting portion and the second resisting portion.

6. The power supply assembly of claim 1, wherein the positioning element further comprises a first securing portion extending from the first step ladder-shaped positioning tab, and the first securing portion is secured to the cover panel.

7. The power supply assembly of claim 1, wherein an elastic element is sandwiched between the side panel and the power supply.

8. The power supply assembly of claim 1, wherein an airflow opening is defined in the rear panel corresponding to the power supply.

9. The power supply assembly of claim 8, wherein a plurality of positioning holes is defined in the power supply, and the rear panel comprises a plurality of protrusions surrounding the airflow opening mounted in the plurality of positioning holes.

10. The power supply assembly of claim 8, wherein the rear panel comprises a resisting plate adjacent to the airflow opening, and the power supply is disposed between the resisting plate and the side panel to be prevented from moving along the second direction.

11. A power supply assembly, comprising:
a power supply; and
an enclosure body, the enclosure body comprising a bottom panel, a rear panel, that is substantially perpendicular to the bottom panel, and a side panel, that is substantially perpendicular to the bottom panel, and the rear panel, the enclosure body receiving the power supply to enable the power supply only to move along a first direction substantially perpendicular to the bottom panel;
a cover panel mounted to the enclosure body, the cover panel substantially parallel to the bottom panel; and
a positioning element mounted to the cover panel, the positioning element abuts the power supply to prevent the power supply from moving along the first direction;
wherein an elastic element is sandwiched between the side panel and the power supply.

12. The power supply assembly of claim 11, wherein the positioning element comprises a first step ladder-shaped positioning tab abuts two adjacent surfaces of the power supply to prevent the power supply from moving along the first direction and a second direction substantially perpendicular to the side panel.

13. The power supply assembly of claim 12, wherein the positioning element comprises a second step ladder-shaped position tab resisting two adjacent surfaces of the power supply.

14. The power supply assembly of claim 13, wherein the bottom panel comprises a first resisting portion, and the power supply is disposed between the first resisting portion and the rear panel to be prevented from moving along the first direction.

15. The power supply assembly of claim 12, wherein the bottom panel comprises a second resisting portion, and the power supply is disposed between the second resisting portion and the side panel to be prevented from moving along the second direction.

16. The power supply assembly of claim 15, wherein the bottom panel comprises a third resisting portion adjacent to the side panel, the power supply disposed between the third resisting portion and the second resisting portion.

17. The power supply assembly of claim 12, wherein the positioning element further comprises a first securing portion extending from the first step ladder-shaped positioning tab, and the first securing portion is secured to the cover panel.

18. The power supply assembly of claim 11, wherein a plurality of positioning holes is defined in the power supply, and the rear panel comprises a plurality of protrusions mounted in the plurality of positioning holes.

19. The power supply assembly of claim 11, wherein the rear panel comprises a resisting plate, and the power supply is disposed between the resisting plate and the side panel to be prevented from moving along a direction that is substantially perpendicular to the side panel.

* * * * *